(12) United States Patent
Inoue et al.

(10) Patent No.: US 7,541,544 B2
(45) Date of Patent: Jun. 2, 2009

(54) POLYESTER RESIN COMPOSITION AND INSULATED WIRE USING SAME

(75) Inventors: Takashi Inoue, Yonezawa (JP); Kenichiro Fujimoto, Hitachi (JP); Kentaro Segawa, Hitachi (JP); Hitoshi Kimura, Hitachi (JP); Tomiya Abe, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 0 days.

(21) Appl. No.: 12/018,281

(22) Filed: Jan. 23, 2008

(65) Prior Publication Data

US 2008/0193756 A1 Aug. 14, 2008

(30) Foreign Application Priority Data

Jan. 23, 2007 (JP) .............................. 2007-012505

(51) Int. Cl.
*H01B 7/00* (2006.01)
(52) U.S. Cl. .............................. 174/110 R; 174/120 R
(58) Field of Classification Search .................. 174/36, 174/110 R, 119 R, 120 R, 121 AR, 120 C, 174/120 AR See application file for complete search history.

(56) References Cited

U.S. PATENT DOCUMENTS

| 5,225,482 | A  | * | 7/1993  | Nakagawa et al. | 525/71    |
|-----------|----|---|---------|-----------------|-----------|
| 5,436,296 | A  | * | 7/1995  | Swamikannu et al.| 525/166   |
| 6,242,097 | B1 | * | 6/2001  | Nishiguchi et al.| 428/383   |
| 7,282,535 | B2 | * | 10/2007 | Kakeda et al.   | 525/88    |
| 7,354,654 | B2 | * | 4/2008  | Masuda et al.   | 428/515   |
| 2004/0147674 | A1 | * | 7/2004 | Kakeda et al.   | 525/88    |
| 2004/0204530 | A1 | * | 10/2004 | Masuda et al.  | 524/474   |
| 2007/0262483 | A1 | * | 11/2007 | Grasselli et al.| 264/172.19 |

FOREIGN PATENT DOCUMENTS

| JP | 09-320356     | 12/1997 |
| JP | 2968584       | 8/1999  |
| JP | 2002-343141   | 11/2002 |
| JP | 2003-213112   | 7/2003  |
| JP | 2003-221498   | 8/2003  |
| JP | 2003-226798   | 8/2003  |
| JP | 3590057       | 8/2004  |
| JP | 3650474       | 2/2005  |
| WO | WO 91/06106   | 5/1991  |
| WO | WO 94/27298   | 11/1994 |

* cited by examiner

*Primary Examiner*—William H Mayo, III
(74) *Attorney, Agent, or Firm*—Antonelli, Terry, Stout & Kraus, LLP.

(57) ABSTRACT

A polyester resin composition according to the present invention includes: a PBT resin; a styrene system elastomer; and a compound having a glycidyl group or a polyolefin composition in an amount of 50-80 wt %, 10-30 wt % and 10-30 wt %, respectively.

10 Claims, No Drawings

POLYESTER RESIN COMPOSITION AND INSULATED WIRE USING SAME

CLAIM OF PRIORITY

The present application claims priority from Japanese application serial no. 2007-012505 filed on Jan. 23, 2007, the content of which is hereby incorporated by reference into this application.

BACKGROUND OF THE INVENTION

1. Field of the Invention

The present invention relates to polyester resins with high heat resistance and insulated wires to which such resins are applied, and more particularly to polyester resin compositions with high heat resistance and insulated wires using them, which are excellent in tensile elongation properties after heat treatment.

2. Description of Related Art

Conventionally, materials including a polyvinyl chloride (PVC) resin have commonly and widely been used as an electrical insulator. Such insulating materials containing PVC provide advantages of excellent properties in practical use and low cost. However, they have an environmental pollution problem associated with waste disposal because, e.g., they release a gas containing chloride during incineration. Thus, in recent years, there has been a need for an alternative material that can replace PVC.

On the other hand, in the transportation industry such as automobiles and trains, there is a growing requirement for energy conservation by reducing the weight of a vehicle body and by saving space for electrical wiring in a vehicle, which in turn causes a demand for lighter and thinner wires. In order to meet such demand for lighter and thinner wires, however, use of conventional PVC materials presents a problem in that it cannot satisfy the required properties such as flame retardancy and abrasion resistance.

Polyester resins are a type of general-purpose engineering plastic polymers. They, particularly polybutylene terephthalates (PBTs), are crystalline polymers and excellent in heat resistance, mechanical strength, electrical properties, chemical resistance and moldability. Also, they have properties of low water-absorbing as well as excellent dimensional stability, and readily achieve flame retardant properties. These features allow them to be applied to a wide variety of fields such as automobiles, electrical systems, electronics, insulating materials and office automation systems (e.g., JP-B-2968584, JP-B-3590057, JP-A-2002-343141 and JP-B-3650474).

As the polyester resins, there are known: polyester resin compositions including: a polyolefin system resin; a vinyl aromatic compound/conjugated diene compound block copolymer; an olefin copolymer containing an epoxy group; and a vinyl copolymer (e.g., JP-A-2003-213112 and JP-A-2003-221498). It is also known: resin compositions including a polyester resin, a styrene system elastomer and a nitrogen containing compound (refer to JP-A-2003-226798).

Such general-purpose engineering plastic polymers having the above-mentioned features are expected to provide lighter and thinner wires while maintaining flame retardancy and abrasion resistance. While there has been a demand for thinner wire coatings for vehicle use from the viewpoint of energy and ecology conservation, the thickness requirement has been further toughened from approximately 0.5 mm to a lesser thickness (for example, below 0.3 mm). Furthermore, coating materials for vehicle-use wires are required to maintain their tensile properties after heat treatment.

However, polyester resins such as polyethylene terephthalates and polybutylene terephthalates are crystalline polymers, and therefore undergo crystallization by heat treatment, thus significantly degrading mechanical properties, particularly tensile elongation properties, after the heat treatment.

SUMMARY OF THE INVENTION

Under these circumstances, the present invention is originated to solve the above problems. It is an object of the present invention to provide a polyester resin composition and an insulated wire using the same, which suppresses crystallization of the polyester resin, particularly the PBT resin, by heat treatment, and prevents the degradation of the mechanical properties after the heat treatment.

In order to achieve the object, a polyester resin composition of the present invention includes: a polyester resin such as a PBT resin; a styrene system elastomer; and a compound having a glycidyl group or a polyolefin composition, thereby suppressing crystallization after heat aging and providing excellent mechanical properties, particularly high tensile elongation properties. The polyester resin composition of the present invention has a tensile elongation of not less than 200% after a heat treatment at 100-150° C. for 100 hours.

Preferably, the polyester resin composition of the present invention includes: the polyester resin (A) in an amount of 50-80% by weight; the styrene system elastomer (B) in an amount of 10-30% by weight; and the compound having a glycidyl group or the polyolefin composition (C) in an amount of 10-30% by weight.

In addition, the polyester resin (A) is preferably a polybutylene terephthalate; the styrene system elastomer (B) is preferably a hydrogenated copolymer of styrene and diene, more preferably a copolymer of styrene and butadiene; the compound having a glycidyl group (C) is preferably triglycidyl cyanurate, monoallyl diglycidyl cyanurate, or an ethylene/glycidyl methacrylate copolymer, particularly preferably an ethylene/glycidyl methacrylate copolymer; and the polyolefin composition (C) is preferably a low-density linear polyethylene.

Moreover, the polyester resin composition of the present invention is preferably used as an insulator for covering an electrical wire, in which the insulator preferably has a thickness of 0.1-0.5 mm, more preferably 0.2-0.4 mm.

(Advantages of the Invention)

A polyester resin composition of the present invention has high heat resistance, particularly a high tensile elongation of not less than 200% after heat treatment, and therefore can advantageously be applied to electric wires for use in vehicles such as automobiles and trains.

DETAILED DESCRIPTION OF THE PREFERRED EMBODIMENTS

A preferred embodiment of the present invention will be described in detail below. However, the present invention is not limited to the embodiments described herein.

The polyester resin (A) used in the present invention is preferably polyethylene terephthalate, polybutylene terephthalate (PBT), polybutylene isophthalate, etc. In particular, the polybutylene terephthalate (PBT) resin can be of any conventionally known type, and the molecular structure thereof is not particularly limited. The amount of the PBT resin is 50-80 wt %, preferably 70-80 wt %. An amount of the PBT resin exceeding the upper limit of 80 wt % suppresses the crystallization to some extent compared to PBT alone; however its effect is not sufficient and it degrades the mechanical properties of the composition after heat treatment. An amount below the lower limit of 50 wt % impairs the unique properties of PBT, such as excellent heat resistance, mechanical strength, electrical properties and chemical resistance.

The styrene system elastomer (B) used in the present invention is preferably a hydrogenated block copolymer (such as SEBS) obtained by hydrogenating and saturating the double bonds of a block copolymer of styrene and diene (e.g., butadiene and isoprene) such as a styrene-butadiene block copolymer (e.g., SBS and SBR) and a styrene-isoprene block copolymer (e.g., SIS and SIR). Such a block copolymer may be modified, as needed, with an organic carboxylic acid or the like. The amount of the styrene system elastomer is preferably 10-30 wt %. An amount of the styrene system elastomer exceeding the upper limit of 30 wt % decreases the content of the PBT in the resin composition, thereby impairing the unique properties of PBT, such as excellent heat resistance, mechanical strength, electrical properties and chemical resistance. An amount below the lower limit of 10 wt % decreases its effect as a softening ingredient, and thus can impair the flexibility of the polyester resin composition with high heat resistant.

The compound having a glycidyl group (C) used in the present invention is preferably triglycidyl cyanurate, monoallyl diglycidyl cyanurate, an ethylene/glycidyl methacrylate copolymer, an ethylene/glycidyl methacrylate/vinyl acetate copolymer and an ethylene/glycidyl methacrylate/methyl acrylate copolymer, particularly preferably an ethylene/glycidyl methacrylate copolymer. The amount of the compound having a glycidyl group added is preferably 10-30 wt %. An amount of the compound having a glycidyl group exceeding the upper limit of 30 wt % increases the chemical reactivity and the viscosity of the molten resin composition during kneading, thus making the kneading difficult. An amount below the lower limit of 10 wt % has an effect of suppressing crystallization than PBT alone; however the effect is not sufficient and degrades the mechanical properties after the heat treatment.

The polyolefin composition (C) used in the present invention is preferably a low-density polyethylene. The amount of the polyolefin composition added is preferably 10-30 wt %. An amount of the polyolefin composition exceeding the upper limit of 30 wt % reduces the content of the PBT in the resin composition, thereby impairing the unique properties of PBT, such as excellent heat resistance, mechanical strength, electrical properties and chemical resistance. An amount below the lower limit of 10 wt % degrades the mechanical properties after the heat treatment.

In order to increase flame retardancy, a nitrogen containing compound may be added to the high heat resistant polyester resin of the present invention. The nitrogen containing compound used as a flame retardant includes melamine cyanurate, melamine, cyanuric acid, isocyanuric acid, triazine derivatives and isocyanurate derivatives, but is particularly preferably melamine cyanurate. The melamine cyanurate is used in powder form, and may be untreated or surface treated with a material such as a coupling agent (e.g., an amino silane coupling agent, an epoxy silane coupling agent and a vinyl silane coupling agent) and a higher fatty acid (e.g., stearic acid and oleic acid). The amount of the nitrogen containing compound added is typically 5-40 weight parts, preferably 5-30 weight parts based on 100 total weight parts of the polyester resin composition consisting of the PBT resin (A), the styrene system elastomer (B) and the compound having a glycidyl group or the polyolefin composition (C). An amount of the nitrogen containing compound added exceeding the upper limit of 40 weight parts degrades the abrasion resistance of the polyester resin composition. An amount below the lower limit of 5 weight parts does not develop any sufficient flame retardant effect.

Moreover, in order to improve or adjust the moldability or the properties of molded products, other resins or various additives may be added to the polyester resin composition of the present invention in such an amount as not to adversely affect the object of the present invention. Such an additive includes antioxidants, reinforcers, fillers, heat stabilizers, UV absorbers, lubricants, pigments, dyes, flame retardants, plasticizers, nucleators and hydrolysis inhibitors.

The polyester composition mentioned above can be prepared by melt kneading using a batch kneader, a twin screw extruder, etc. The extruder is not limited to a twin type. The mixture obtained using such a melt kneader is pelletized to about the size of a grain of rice and pre-dried in a vacuum dryer.

A conductor used in an insulated wire of the present invention may be a single copper wire, a twisted wire or a braided wire, and the copper wire may be plated by hot dipping or electrolysis. The conductor preferably has a diameter of approximately 0.5-2 mm. The cross section shape of the conductor is not limited to a round shape but may have, without causing any problem, a rectangular shape obtained by slitting a copper plate or rolling a round wire. In an insulated wire of the present invention, a conductor is covered with the melt kneaded polyester resin composition with high heat resistant according to the present invention. A wire of the present invention can be formed using known methods. For example, it can be prepared by extruding the polyester resin composition with high heat resistant around a single or multiple conductors in a conventional extrusion line.

EXAMPLES

The present invention will be described in more detail with reference to, but is not limited to, the following examples and comparative examples.

Table 1 shows Examples 1-8 and Comparative examples 1-13.

TABLE 1

| | Resin Composition (wt %) | | | | Initial Tensile Elongation (%) | Tensile Elongation after Heat Treatment (%) | Remaining Elongation Percentage (%) | Pass/ Fail |
|---|---|---|---|---|---|---|---|---|
| | (A) | (B) | (C) | | | | | |
| | PBT | SEBS | EGMA | LLDPE | | | | |
| Example 1 | 70 | 20 | 10 | — | 390 | 310 | 79 | o |
| Example 2 | 70 | 20 | — | 10 | 380 | 310 | 82 | o |
| Example 3 | 70 | 20 | 5 | 5 | 490 | 410 | 84 | o |
| Example 4 | 80 | 10 | 10 | — | 360 | 290 | 81 | o |

TABLE 1-continued

|  | Resin Composition (wt %) | | | | Initial Tensile Elongation (%) | Tensile Elongation after Heat Treatment (%) | Remaining Elongation Percentage (%) | Pass/ Fail |
|---|---|---|---|---|---|---|---|---|
|  | (A) PBT | (B) SEBS | (C) EGMA | (C) LLDPE | | | | |
| Example 5 | 80 | 10 | — | 10 | 380 | 290 | 76 | o |
| Example 6 | 60 | 30 | 10 | — | 320 | 230 | 72 | o |
| Example 7 | 60 | 30 | — | 10 | 340 | 240 | 71 | o |
| Example 8 | 50 | 20 | 20 | 10 | 300 | 210 | 70 | o |
| Comparative example 1 | 100 | — | — | — | 50 | 0 | 0 | X |
| Comparative example 2 | 90 | — | 10 | — | 315 | 0 | 0 | X |
| Comparative example 3 | 90 | — | — | 10 | 320 | 0 | 0 | X |
| Comparative example 4 | 80 | 20 | — | — | 410 | 20 | 5 | X |
| Comparative example 5 | 70 | — | 20 | 10 | 320 | 0 | 0 | X |
| Comparative example 6 | 80 | 3 | 17 | — | 350 | 30 | 9 | X |
| Comparative example 7 | 80 | 3 | — | 17 | 350 | 40 | 11 | X |
| Comparative example 8 | 90 | 5 | 5 | — | 120 | 0 | 0 | X |
| Comparative example 9 | 40 | 40 | 20 | — | 260 | 30 | 12 | X |
| Comparative example 10 | 30 | 50 | 20 | — | 240 | 80 | 33 | X |
| Comparative example 11 | 40 | 30 | 30 | — | 220 | 30 | 14 | X |
| Comparative example 12 | 40 | 20 | 40 | — | 250 | 20 | 8 | X |
| Comparative example 13 | polyvinyl chloride (100) | | | | 280 | 0 | 0 | X |

Notes:
PBT; polybutylene terephthalate, Toray Industries, Inc. (TORAYCON 1401X06)
SEBS; hydrogenated styrene-butadiene-styrene block copolymer, Kuraray Co., Ltd. (SEPTON 8006)
EGMA; ethylene/glycidyl methacrylate, Sumitomo Chemical Co., Ltd. (BONDFAST 2C)
LLDPE; low-density linear polyethylene, Prime Polymer Co., Ltd. (NEO-ZEX 0134M)

(Preparation of Electrical Wire)

In each of Examples 1-8 and Comparative examples 1-13, a pelletized resin composition was prepared by mixing the components in the amounts shown in Table 1, and then by melt kneading the mixture at 260° C. using a twin screw extruder. The resulting resin compositions were vacuum dried at 120° C. for 10 hours. They were then extruded around an annealed copper wire of tin-plated with 1.3-mm-diameter, thereby obtaining an insulated wire having an insulator thickness of 0.3 mm. The extrusion was performed using a 4.2-mm-diameter die and 2.0-mm-diameter nipple at a cylinder temperature of 230-260° C. and a head temperature of 260° C. The extrusion rate was 5 m/min.

(Tensile Test)

Test specimens were prepared by removing the core wire from the above-prepared insulated wires, which were then measured for the tensile elongation at a pull rate of 200 mm/min. The tensile test was performed according to JIS C 3005.

(Heat Aging Test)

Thus prepared wires were heated in a thermostatic bath at 150° C. for 100 hours and then left at room temperature for 12 hours, and thereafter were tensile tested. The heat treatment was performed according to JIS C 3005 WL1.

In each test, specimens having "a remaining elongation percentage of not less than 70%" and "a tensile elongation after heat treatment of not less than 200%" were determined to pass the test (marked with "O" in Table 1), while the others were determined to fail the test (marked with "x" in Table 1). Here, it is defined that "remaining elongation percentage (%)=(after-heat-treatment tensile elongation)/(initial tensile elongation)×100".

As shown in Table 1 it is confirmed that Examples 1-8 have a remaining elongation percentage of not less than 70% and a tensile elongation after heat treatment of not less than 200%, and that Examples 1-8 exhibit little decrease in the mechanical properties after the heat treatment.

By contrast, Comparative example 1 contains only the PBT resin, and therefore developed no initial tensile elongation. Comparative examples 2-4, which contain only two components; the PBT resin and one of the SEBS, EGMA and LLDPE resins, developed some initial tensile elongation. However, a tensile elongation of Comparative examples 2-4 significantly decreased after the heat treatment. The result of Comparative example 5 shows that adding 30 combined weight % of the EGMA and LLDP resins but no softening component of the SEBS resin to the PBT resin developed no tensile elongation after the heat treatment. Further, as can be seen from the results of Comparative examples 6-12, there was observed significant decrease in elongation after the heat treatment for the resin compositions (Comparative Examples 6-8) containing less than 10 wt % of SEBS and less than 20 wt % of one of EGMA and LLDPE, and for the resin compositions (Comparative examples 9-12) containing less than 50 wt % of PBT. Meanwhile, polyvinyl chloride (Comparative example 13) used in conventional wires had an excellent initial elongation but exhibited a significant decrease in the elongation after heat treatment.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A polyester resin composition, comprising:
    (A) a polyester resin of a crystalline polymer in an amount of 50-80% by weight;
    (B) a styrene system elastomer in an amount of 10-30% by weight; and
    (C) a compound having a glycidyl group or a polyolefin composition in an amount of 10-30% by weight.

2. The polyester resin composition according to claim 1, wherein the composition has a tensile elongation of not less than 200% after a heat treatment at 150° for 100 hours.

3. The polyester resin composition according to claim 1, wherein the polyester resin (A) is a polybutylene terephthalate.

4. The polyester resin composition according to claim 1, wherein the styrene system elastomer (B) is a copolymer of an olefin system polymer and a styrene system polymer.

5. The polyester resin composition according to claim 1, wherein the compound having a glycidyl group (C) is selected from the group consisting of triglycidyl cyanurate, monoallyl diglycidyl cyanurate and an ethylene/glycidyl methacrylate copolymer; and the polyolefin composition (C) is a low-density polyethylene.

6. An insulated wire, comprising:
    a conductor; and
    the polyester resin composition according to claim 1 for covering and insulating the conductor, wherein the insulating composition around the conductor has a thickness within a range from 0.1 to 0.5 mm.

7. The polyester resin composition according to claim 1, wherein the polyester resin (A) is selected from the group consisting of polyethylene terephthalate, polybutylene terephthalate and polybutylene isophthalate.

8. The polyester resin composition according to claim 7, wherein the polyester resin (A) is present in an amount of 70-80% by weight.

9. An insulated wire, comprising:
    a conductor; and
    the polyester resin composition according to claim 8 for covering and insulating the conductor, wherein the insulating composition around the conductor has a thickness within a range from 0.1 to 0.5 mm.

10. An insulated wire, comprising:
    a conductor; and
    the polyester resin composition according to claim 7 for covering and insulating the conductor, wherein the insulating composition around the conductor has a thickness within a range from 0.1 to 0.5 mm.

* * * * *